Nov. 14, 1950        G. CHAUSSON        2,529,915
HEATING AND ANTIFREEZING APPARATUS FOR AIRCRAFT
Filed July 17, 1946                              3 Sheets—Sheet 1
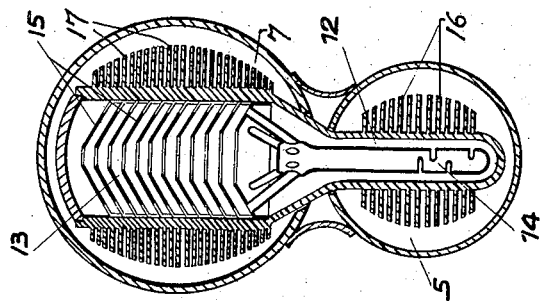
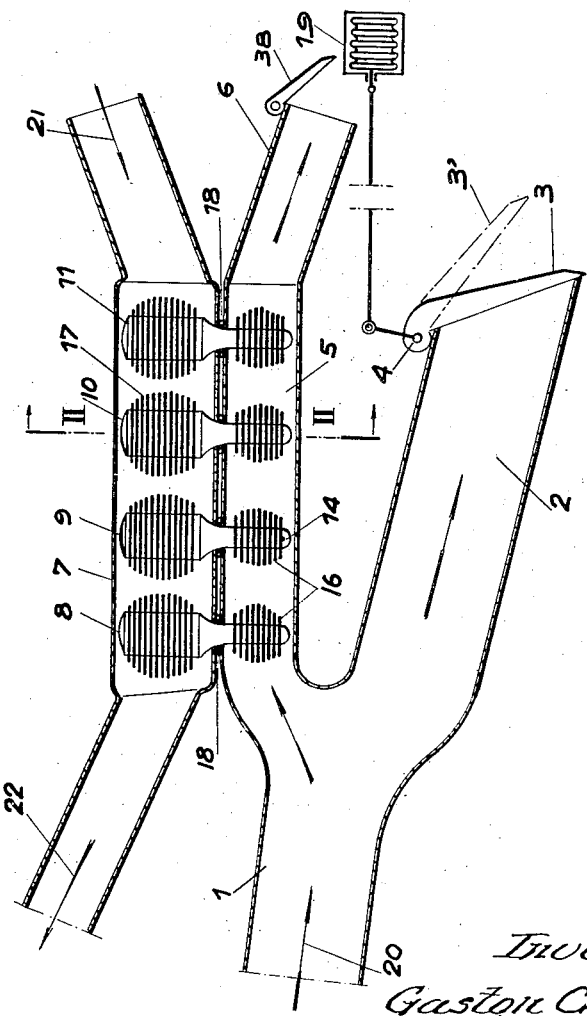
Inventor
Gaston Chausson Nov. 14, 1950 G. CHAUSSON 2,529,915
HEATING AND ANTIFREEZING APPARATUS FOR AIRCRAFT
Filed July 17, 1946 3 Sheets-Sheet 2

Inventor
Gaston Chausson
By [signature]
Atty.

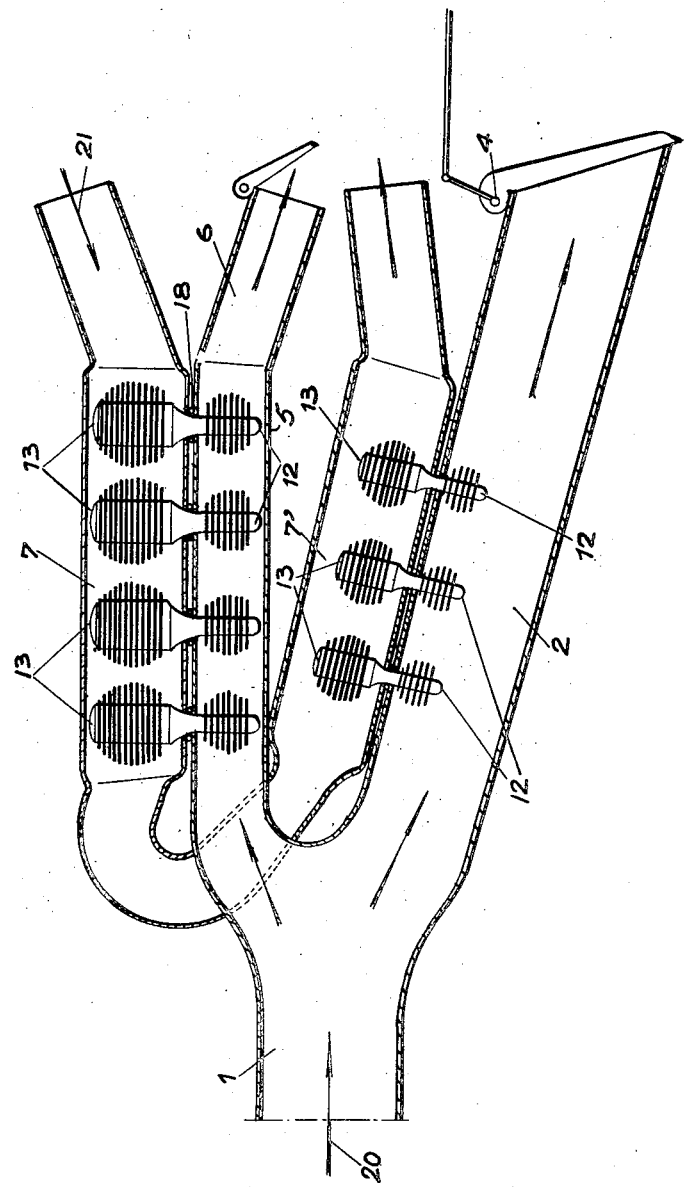

Patented Nov. 14, 1950

2,529,915

UNITED STATES PATENT OFFICE 2,529,915

HEATING AND ANTIFREEZING APPARATUS FOR AIRCRAFT

Gaston Chausson, Asnieres, France, assignor to Societe Anonyme des Usines Chausson, Asnieres, France, a company of France Application July 17, 1946, Serial No. 684,343
In France August 3, 1945

3 Claims. (Cl. 237—2)

The present invention has for its object to provide a heating and/or defreezing apparatus for aircraft which employs the heat of the exhaust gases of the engine or engines in the largest measure.

According to the invention, the exhaust pipe or pipes of the engine or engines are divided into two branches one of which is of larger section serves mainly for the free exhaust while the other has a smaller section, and a conduit through which flows air or other fluid to be preheated by said exhaust pipes and for the heating of a space or the antifreezing or defreezing of ice on certain parts of an aircraft such as, for example, the leading edges of the wings, the controls and the like. The conduit extends along at least a part of the branch of the exhaust pipe having the smaller section and, as the case may be, also along the branch of said pipe with the larger section. Heat exchange elements are arranged with their receiving part in the branch of the exhaust pipe which has the smaller section as well as, as the case may be, in the branch of said pipe having the larger section and with their transmitting part in said conduit or conduits for the fluid to be preheated, and a closure member is mounted on the branch of the exhaust pipe having the larger section makes it possible to cause the exhaust gases selectively to pass through said branch or through the branch having the smaller section.

According to another feature, a second closure member is also mounted on the branch of the exhaust pipe having the smaller section and connected with the closure member of the branch having the larger section so as to close when the latter is open and vice versa.

The closure members can be actuated either by hand or automatically. According to a preferred arrangement, the closure members are actuated automatically by a servo-motor under impulses supplied by a temperature responsive element located in the parts of the aircraft which are to be heated or in the leading edges to be defrosted.

The heat exchange elements are formed of boiler tubes which are entirely closed and contain in their lower part located in the branch of the exhaust pipe having the smaller section a liquid to be vaporized, said liquid condensing in the part of said boilers which is located in the conduit for the air to be heated where the heat developed by said condensation is transmitted to the flowing air.

Further objects and advantages of my invention will be apparent from the description and claims.

In the drawing, in which embodiments of my invention are illustrated.

Figure 1 is a diagrammatic vertical sectional view of a hot air producing device used according to the invention for heating and defreezing purposes.

Figure 2 is an enlarged sectional view through line II—II of Figure 1.

Figure 4 is a view similar to Figure 1 showing a modification.

Figure 3:
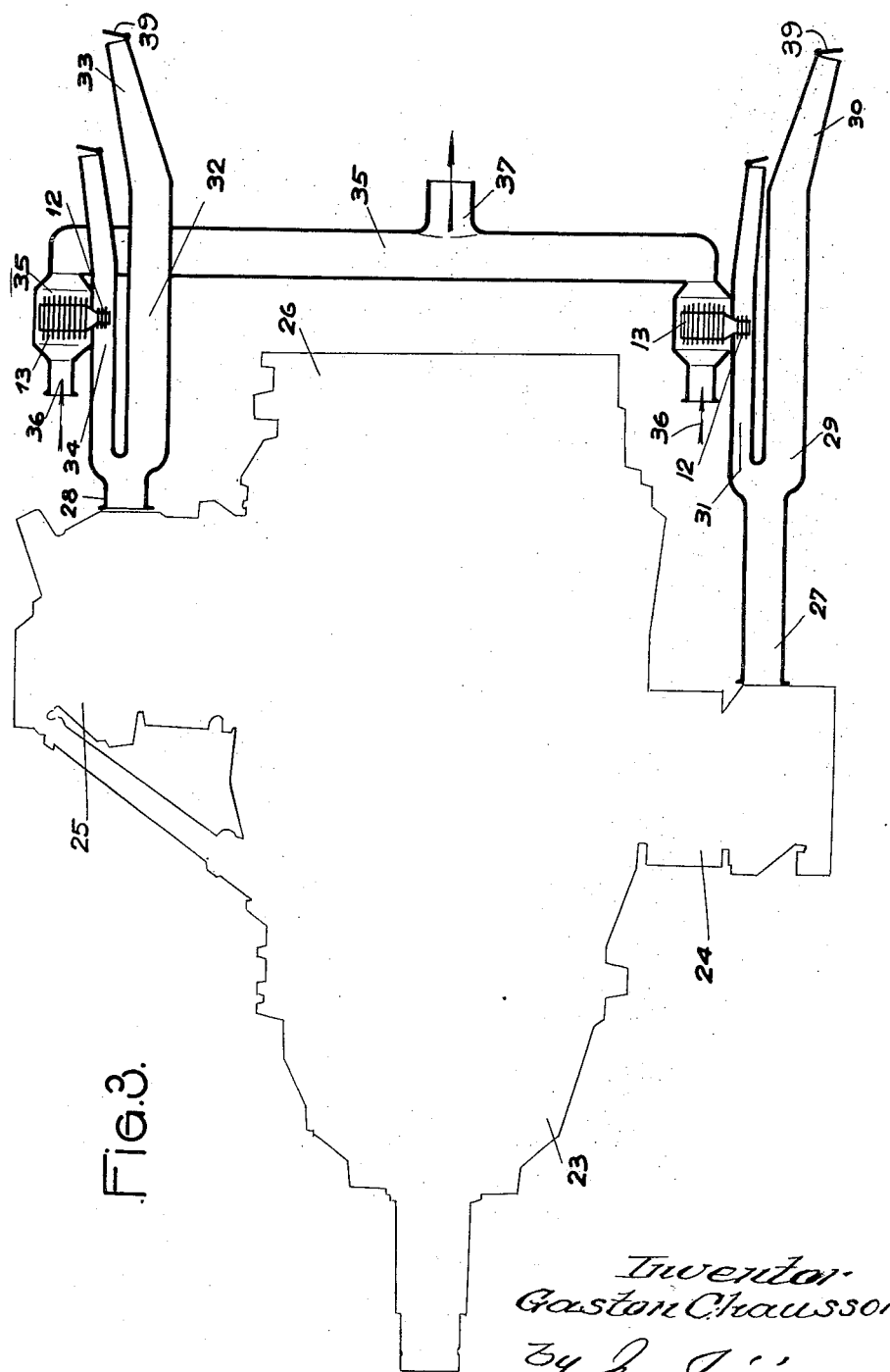
Figure 3 is a diagrammatic side elevational view, partly in section, of a modification of the hot air producing device mounted on a radial engine.

According to Figures 1 and 2 the exhaust gas manifold 1 of the engine or engines of the aircraft is divided into two branches one of which 2, has a large section and serves for the free exhaust when the flap 3 pivotally mounted at 4 at the end of said branch is open in the broken line position 3'. The other branch, 5, preferably has a smaller section and opens to the atmosphere at 6.

An air heating conduit 7 is located above the smaller branch 5 of the exhaust pipe. Heat exchange elements 8, 9, 10, 11 are located partly in the smaller branch 5 of the exhaust gas pipe and partly in the air heating conduit 7.

As shown in Figure 2 said heat exchange elements each comprises a closed boiler made of fire-proof material or of a material unaffected by hot liquids and gases as, for example, stainless steel. The boiler includes a part 12 preferably having a smaller diameter and located in the branch 5 of the exhaust pipe and a part 13 having a larger diameter communicating with the part 12 and located in the hot air producing pipe 7. A liquid, such as distilled water 14, is contained in the lower part 12 of the element and perforated plates 15 are stacked in the upper part 13. Furthermore, ribs 16 surround the part 12 located in the exhaust pipe 5 and ribs 17 surround the part having a larger diameter and located in the air heating pipe 7. The plates and upper and lower ribs can be integral with the boiler tube or they may be individually formed and welded, brazed or assembled thereon by any known methods.

Intercalary joints 18 made of a fire-proof material are provided with advantage between the branch 5 of the exhaust gas pipe and the air heating conduit 7 for avoiding any contact between said pipes as well as for preventing gas leakage.

The flap 3 at the end of the larger exhaust gas pipe 2 can be actuated directly by hand or by means of a servo-control 19 which can be actuated, for example, by a thermostat, not shown, in the space or on the element to be heated. In the case of defrosting or deicing, the thermostat of the device 19 is located, for example, at the portions subject to freezing and which are to be heated, such as the leading edge of the wing.

The device works in the following manner:

The exhaust gases coming from the engine enter the pipe 1 in the direction of the arrow 20. When the working of the heating or deicing plant is not necessary, the flap 3 is opened to the position 3' so that the exhaust gases are discharged for the greatest part by the branch 2 of the exhaust pipe having the larger section and opening into the atmosphere directly or through the medium of reaction exhaust pipes or the like with which the aircraft is initially provided.

If the heating or deicing is desired, the flap 3 is closed, totally or partially, so that the exhaust gases are compelled to pass through the branch 5 having a smaller section to reach the atmosphere at 6. During this passage through the branch 5, the gases contact at a high speed the lower parts 12 of the heat exchange elements as well as the ribs 16 on said parts 12. Consequently, the liquid 14, distilled water for example, is rapidly brought to boiling. The rising steam condenses in the upper parts 13 of the heat exchange elements on perforated plates 15 which collect the distilled water on their peripheries. The developed heat heats the walls of the part 13 of the heat exchange elements as well as the ribs 17 on said parts, while the condensed water flows down by gravity along the central pipe until it reaches the lower part 12. The air, flowing in the direction of the arrow 21 into the conduit 7, is heated by contact with the wall of the parts 13 of the heat exchange elements as well as with the ribs 17. The air then flows in the direction of the arrow 22 to the space to be heated or the inside of the elements to be deiced such as, for example, leading edges of an aircraft wing.

Figure 3 shows a modification in which the hot air producing device, according to the invention, is applied to a radial engine comprising separated exhausts for each cylinder. The engine comprises, for example, a speed reducing gear casing 23, a front cylinder star 24, a rear cylinder star 25 and a casing 26 for accessories. Each cylinder 24 of the front star comprises an exhaust pipe 27 and each cylinder 25 of the rear star comprises an exhaust 28. Each one of said exhaust pipes is divided into two branches as previously described, the exhaust pipe 27 comprising a branch 29 leading, for example, to a reaction pipe 30 and a branch 31 having a smaller section containing the part 12 of a heat exchange device like that of Figure 2.

Likewise, the exhaust pipe 28 comprises a branch 32 leading to a reaction pipe 33 and a branch 34 having a smaller section and containing the part 12 of the heat exchange device. A manifold 35 in the form of a crown collects the air heated on the parts 13 of the heat conveying elements. The cold air enters the manifold 35 through its inlets in the direction of the arrows 36. The heated air is then passed through one or more outlet conduits 37 to the space to be heated or to the elements to be deiced.

Closure members 39, similar to the flap 3, are mounted on the branches 29 and 32 having the larger section in the various exhaust pipes make it possible either to open said branches for insuring the exhaust through the same and the reaction pipes 30, 33 or to close said branches totally or partially for causing the exhaust gases to pass through the heating branches 31, 34. Said closure members can be actuated either by hand or automatically by impulses given by means of temperature responsive elements such as a thermostat mounted in the space to be heated or in the parts of the aircraft to be deiced.

It is obvious that the flap 3 or the closure members 38 used in its place must be cooled in order to avoid their being burnt up.

Again, said flaps could be arranged with advantage, in the case of a mounting with reaction pipes, at the end of said pipes on a crown comprising a single control actuated by any servo-motors or known means and used, for example, on the flaps of radial engine cowls.

When the hot air is intended to be used both for heating and deicing purposes or for antifreezing (which requires a much smaller power than the preceding) it is possible that in normal operation the small quantity of exhaust gases which passes through the by-pass 5, despite opening of the flap 3, will be sufficient for supplying the heat which is necessary for the conditioning or antifreezing. If the heat available from this fact is not sufficient for both said permanent uses it is possible to resort to the modification shown in Figure 4 in which the air conduit 7, juxtaposed to the smaller exhaust branch 5, has an extension 7' that is juxtaposed in side-by-side relationship with the larger exhaust branch 2, and the heat exchanges 12—13 are also arranged between the conduit 7' and branch 2 to pick up heat from the branch 2 of the exhaust pipe from the normal passage for the gases and transmit said heat to the air passing through the conduit 7'. The additional heat conveyers 12—13 in the branch 2 can be less in number or have smaller dimensions than those which are in the branch 6 in order to offer only a very small resistance to the natural flow of the gases and, consequently, only a negligible counter-pressure on the exhaust of the engine.

In the example shown the air heating conduits 7, 7' are mounted in series. They could as well be mounted in parallel and open into a hot air manifold.

In case no heat is desired except upon closure of the flap 3 of Figure 1 or of the flaps 39 of Figure 3, a flap or closure member 38 may be provided on the smaller branch 5 or 31 and 34 and which can be closed when the flap 3 is open. Thus, a mass of cooled gas accumulates in the branch 5 and all of the hot exhaust gases escape through the branch 2 so that no heat is transmitted to the heat exchange elements 12—13. In this case, the flaps 3 and 38 can be connected by a suitable transmission so that the flap 38 is automatically closed when the flap 3 is open and vice versa.

It is preferred to arrange the branch of the exhaust tube leading to free exhaust or to the reaction pipe so that it is sufficiently spaced or insulated from the branch of small section in which the heat exchange elements are mounted in order to avoid an undue heating of the latter.

A servomotor, not shown, is provided for actuating the flap 3 or the other closure members used in place of said flap under the impulses given by the temperature responsive element 19, Said servomotor can be put in action and out of action by means of a control button mounted on the instrument-board so that the plant works only when the pilot has actuated this button for putting the "heating or defrosting in action."

When the flap 3 or the closure members used in place of it are closed, the exhaust gases pass more and more rapidly through the smaller branch 5, and this increase of flow increases the thermal exchange. Furthermore, the throttling produced in said branch 5 generates a counterpressure on the exhaust of the engine, the efficiency of which is reduced by this fact while the temperature of the exhaust gases rises; this rising of the temperature also increases the thermal exchange so that the heating or defrosting can be effected in an exceedingly efficient manner when the flying conditions require it. Indeed, in critical situations as, for example, in case of heavy freezing encountered in some flights, this arrangement enables the pilot or the boardmaster to use instantaneously a large part of the power dissipated in his engines for overcoming the danger with the maximum of chances of success. Moreover, a connection can be provided between the automatic control of the heating or defrosting and the controls of the engine so as to limit the thermal strain of the latter to a value which is admissible in every case of flight, a self-acting governor being provided, for example, for reducing the admission pressure or the speed of rotation when the hot air consumption increases, the pilot having nevertheless always the possibility to intervene for modifying at will, in case of need, the distribution of the power between the propeller and the exhaust.

When the automatic thermostatic control works it is obvious that the heating or defrosting ceases as soon as the temperature of the space to be heated or of the parts of the aircraft to be deiced attains the regulated level.

In Figure 1 the exhaust gases pass in counterflow with respect to the air to be heated. It is obvious that the invention is not limited to this form of execution, for the air could flow in the same direction as the exhaust gases as this is the case in the lower part of Figure 4.

The invention can also be applied to the heating of any fluid (heated liquid or even a liquid vaporizing in contact with the ribs 17) that may be used instead of air in the conduits 21, 32, 35, 36 and 37, the heated fluid serving as a heat conducting vehicle or being used for any other purposes.

Finally, it may also be desirable in certain cases to replace the distilled water in the heat exchange element by any fluid or even by a solid body melting and conveying the heat by convection, which latter body can be, for example, sodium.

Various other modifications concerning, more particularly, the number and the distribution of the boiler tubes can, moreover, be brought to the forms of execution which have been shown and described without departing from the scope and spirit of the invention which, owing to this fact, can be applied as well to straight or V-type engines as well as to radial engines.

Having thus described my invention, what I claim and desire to secure by Letters Patent is:

1. Heating apparatus for aircraft comprising, in combination, an engine exhaust pipe divided into two branches, one of said branches being smaller in diameter than the exhaust pipe proper and than the other branch, an air supply pipe extending along a portion of said smaller exhaust branch and in side-by-side relation therewith, a plurality of closed boiler heat exchange units extending between and into said smaller exhaust branch and air supply pipe, and closure members selectively operable to close said exhaust branches.

2. Heating apparatus for aircraft comprising, in combination, an engine exhaust pipe divided into two branches, one of said branches being smaller in diameter than the exhaust pipe proper and than the other branch, an air supply pipe extending along a portion of both of said exhaust branches and in side-by-side relation therewith, a plurality of closed boiler heat exchange units extending between and into said exhaust branches and air supply pipe, and closure members selectively operable to close said exhaust branches.

3. Heating apparatus for aircraft comprising, in combination, an engine exhaust pipe divided into two open-ended branches, one of said branches being smaller in diameter than the exhaust pipe proper and than the other branch, an air supply pipe extending along a portion of said smaller exhaust branch and in side-by-side relation therewith, a plurality of closed boiler heat exchange units extending between and into said smaller exhaust branch and air supply pipe, said units including a finned evaporator portion of relatively small diameter in said exhaust branch and a finned condenser portion of relatively large diameter and containing condenser plates in said air pipe, and closure members selectively operable to close the open ends of said exhaust branches.

GASTON CHAUSSON.

REFERENCES CITED

The following references are of record in the file of this patent:

UNITED STATES PATENTS

| Number | Name | Date |
|---|---|---|
| 1,725,906 | Gay | Aug. 27, 1929 |
| 2,076,287 | Arnold | Apr. 6, 1937 |
| 2,119,402 | Puffer | May 31, 1938 |
| 2,412,110 | Williams | Dec. 3, 1946 |

FOREIGN PATENTS

| Number | Country | Date |
|---|---|---|
| 859,930 | France | Sept. 20, 1940 |